Dec. 3, 1957 R. M. DUNHAM ET AL 2,815,447

RANGE MARKER GENERATORS

Filed April 29, 1955

INVENTORS
RICHARD M. DUNHAM
JACK MOFENSON
BY Elmer J. Gorn
ATTORNEY 2,815,447
Patented Dec. 3, 1957

2,815,447

RANGE MARKER GENERATORS

Richard M. Dunham, Newton Center, and Jack Mofenson, Medford, Mass., assignors to Raytheon Manufacturing Company, Waltham, Mass., a corporation of Delaware Application April 29, 1955, Serial No. 504,794
6 Claims. (Cl. 250—27)

Figure 1:
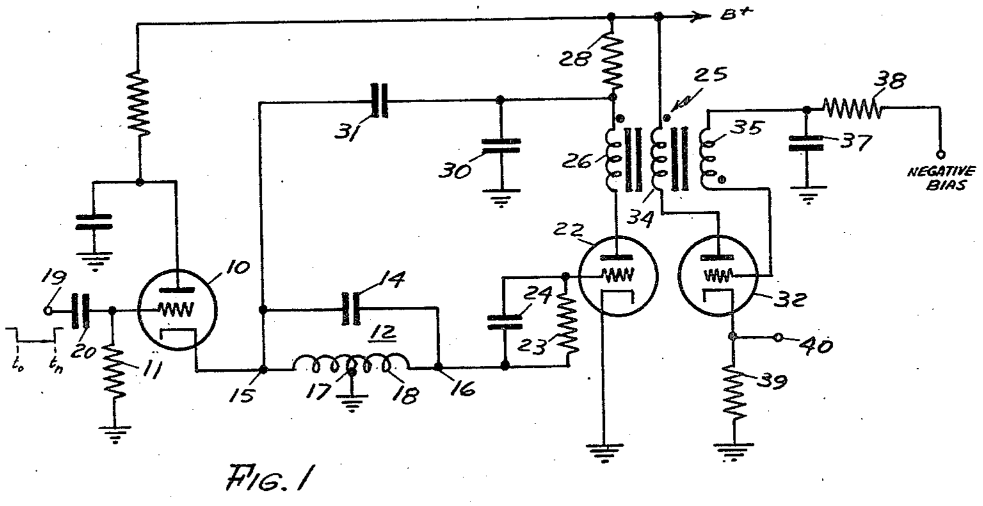

This invention relates to a range marker generating circuit particularly adapted for use with pulse radar systems.

In one of the existing systems for generating range marker pulses, a normally conductive switch tube is cut off by a negative gate whose duration is dependent upon the number of range marker pulses to be generated during a given sweep interval. A tuned circuit in the cathode of this switch tube oscillates periodically during the interval of the negative gate and the wave form of the voltage produced in the tuned circuit will initially swing in a negative direction. When such an oscillatory wave form is applied to the grid of a blocking oscillator trigger stage whose output circuit is magnetically coupled to the blocking oscillator, a wave form will be derived in the output of said trigger stage which consists initially of a small positive-going pulse followed one half cycle later by a larger negative-going pulse during the time that the input wave form becomes more positive than the cutoff bias of the tube, followed, in turn, by a negative-going pulse during the time in which the tube is being cut off, etc. Consequently, the time interval between the leading edge of the gate (corresponding to zero range) and the initiation of the first negative trigger pulse is unequal to the intervals between successive positive trigger pulses. The negative-going pulses, because of their larger amplitude, are the more effective in triggering the blocking oscillator into operation. If they were used, however, the range indication of the first range marker would be incorrect. If the positive-going pulses were used, an additional stage of amplification would be necessary to obtain the proper amplitude for triggering the blocking oscillator. In order to achieve the same interval between the indicated position corresponding to zero range and the first range marker as exists between adjacent range markers, it is desirable that a negative trigger pulse occur after one complete period of oscillation in the tuned circuit of the switch tube, that is to say, the polarity of the wave form generated in said tuned circuit must be reversed. This can be accomplished by adding an amplifier stage, but this increases the cost and complexity of the equipment.

In accordance with this invention, the necessity for an additional amplifier is obviated by connecting the midpoint of the tuned circuit coil to some reference potential, such as ground, so that a reversal of phase occurs between the end of the tuned circuit connected to the cathode of the switch tube and the end connected to the grid circuit of the blocking oscillator trigger stage.

In prior systems of the type previously described, the periodic oscillations generated in the tuned circuit are damped, owing to the presence of resistance in the tuned circuit. This damping may give rise to unstable triggering of the blocking oscillator and, therefore, erroneous range indication may result.

In accordance with the invention, the amplitude of the periodic oscillations is kept substantially constant over the entire sweep interval by means of feedback provided between the output circuit of the blocking oscillator trigger tube and the cathode end of the tuned circuit. The fundamental or low frequency component of the signal appearing in the output of the trigger stage is fed back to the tuned circuit substantially in phase with the energy generated in said tuned circuit, thus maintaining the oscillations in the tuned circuit at a reasonable amplitude level during the period of the gate pulse and insuring proper triggering of the blocking oscillator throughout the sweep interval.

Figure 2:
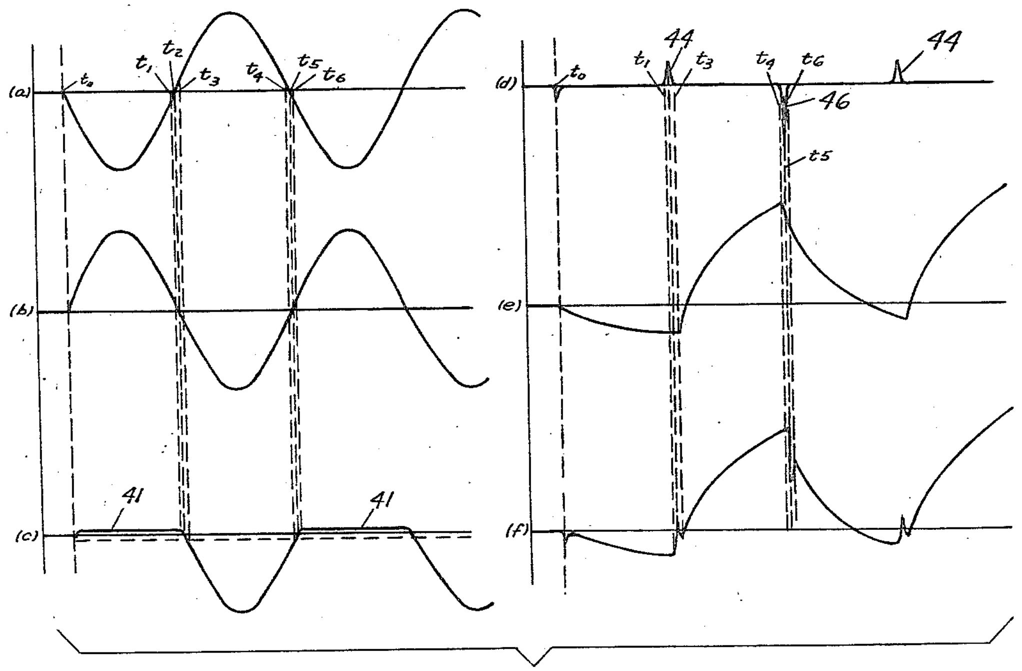

Further advantages of this invention will be apparent as the description thereof progresses, reference being had to the accompanying drawings wherein:

Fig. 1 is a circuit diagram of a range marker generator in accordance with the invention; and Fig. 2 shows wave forms illustrating the operation of the range marker generator of Fig. 1.

Referring to Fig. 1, a tube 10, which hereafter will be referred to as a switch tube, is biased by means of a resistor 11 in the grid circuit thereof so as to be normally conductive. A tuned circuit 12, including a capacitor 14 connected across the terminals 15 and 16 of a coil 18, is disposed in the cathode circuit of tube 10. During the conductive period of tube 10, the entire plate current flows through one-half of coil 18, the midpoint 17 of which is connected to ground, or to some other reference potential, and electromagnetic energy is stored in said coil. Since the cathode impedance of tube 10 is relatively small, the "Q" of the tuned circuit is sufficiently low to prevent oscillations being set up within tuned circuit 12 while tube 10 is conducting.

At some time $t_0$, a negative-going square wave or gate, indicated in Fig. 1, is applied to the input terminal 19 of switch tube 10 and is coupled by way of a capacitor 20 to the grid of tube 10. The leading edge of this gate is synchronized with the beginning of the indicator sweep and the transmitted radar pulse. The trailing edge of the pulse occurs at a time $t_n$, indicated in Fig. 1, and the duration of the gate is dependent upon the maximum range of the radar system, as is well known in the radar art.

Upon arrival of a gate, tube 10 is driven beyond cutoff, the electromagnetic field associated with coil 18 collapses and a voltage is induced in the coil which tends to keep the current flowing therein. Since tube 10 is cut off, the current must continue around the tuned circuit 12 and charge capacitor 14. During conduction, the direction of the electron current flow is from ground through coil 18 and from cathode to anode of tube 10. Since tube 10 is cut off, this electron flow continues through coil 18 in the same direction onto the left-hand plate of capacitor 14 charging it negatively relative to ground. Thus, with tuned circuit 12 located in the cathode circuit of switch tube 10, the initial voltage swing is negative. The tuned circuit 12 is shocked into oscillation at the resonant frequency of said tuned circuit, producing a sinusoidal wave, such as shown in Fig. 2*a*. The values of capacitance and inductance of elements 14 and 18 are chosen so as to produce a predetermined number of oscillations during the time that the gate is applied to the switch tube. The time interval between successive peaks of the sinusoidal wave corresponds substantially to the desired range interval between range marker pulses.

Because of the coupling between the two halves of coil 18, an oscillatory voltage, equal in magnitude but opposite in phase to that appearing at terminal 15 of coil 18 of tuned circuit 12, will be present at terminal 16 of the coil. Since the voltage at the cathode of tube 10 (voltage at terminal 15 of coil 18) initially swings in a negative direction, as shown in Fig. 2*a*, the voltage at terminal 16 of coil 18 will initially swing in a positive direction. This voltage at terminal 16, shown in Fig. 2*b*, is applied to the grid of blocking oscillator trigger tube 22 through a series resistor 23 whose size is large compared with the grid-to-cathode resistance when grid current flows. Trigger tube 22 serves as a conventional grid limiter so that substantially all of the positive half cycles of the grid voltage are limited to a voltage which is essentially zero during the positive swing of the voltage waveform of Fig. 2*b*. The voltage wave form appearing at the grid of trigger tube 22 is shown in Fig. 2*c*. Resistor 23 is shunted by capacitor 24 which compensates for phase shifts resulting from the input capacitance of the tube. The purpose of the grid limiting action will be explained subsequently.

At time $t_0$, trigger tube 22 is conductive and capacitor 30 is discharged through a path including resistor 28 and tube 22; the voltage across resistor 28 in the plate circuit of trigger tube 22 is shown in Fig. 2*e*. At time $t_1$ the voltage 2*c* at terminal 16 of tuned circuit 12 departs from a substantially constant value, indiacted by portion 41 of Fig. 2*c*, and commences to swing negative; at time $t_2$ this voltage is actually starting the negative half of the cycle. At time $t_3$, when the grid voltage falls to cut-off, indicated by the dashed line in Fig. 2*c*, current in the trigger tube 22 ceases.

During the portion of the cycle ($t_1$ to $t_3$) when the grid voltage swings in a negative direction from the limiting value 41 to cut-off, a sharp positive voltage pulse 44 is generated across winding 26 of transformer 25 in the plate circuit of tube 22, as shown in Fig. 2*d*.

At time $t_3$ the voltage across plate resistor 28 rises exponentially, as shown in Fig. 2*e*, because of the presence of capacitor 30 in the plate circuit of tube 22. This voltage 2*e* across resistor 28 continues to rise until, at time $t_4$, the grid voltage at tube 22 has swung sufficiently far in the positive direction to reach cut-off. At this point, tube 22 starts conducting and capacitor 30 discharges exponentially through a path including resistor 28 and the internal resistance of tube 22.

When the grid voltage of blocking oscillator trigger tube 22 reaches cut-off, as at time $t_4$, during its first positive-going excursion, tube 22 conducts and continues to pass current. Since the portion of the entire cycle in which the voltage swings positive from cut-off to the limiting value is extremely small, current builds up rapidly in the plate circuit of tube 22. During this portion of the cycle, a sharp negative pulse of voltage 46, as shown in Fig. 2*d*, appears across winding 26 of transformer 25, and also appears each time thereafter that the grid of tube 22 swings into the conductive region.

During the portion of the cycle when the grid swings positively, tube 22 is conductive and the voltage is decreasing; consequently, by the time the tube cuts off, the current in the transformer winding is relatively low. During the portion of the cycle when the grid swings negatively, capacitor 30 is charging so that, when tube 22 again conducts, the voltage across winding 26 is high and therefore the negative pulse output is large. Because of this, the positive pulses are of considerably smaller amplitude than the negative pulses.

Inasmuch as the discharging circuit includes the internal resistance of tube 22 in addition to the resistor 28 and capacitor 30, the time constant of the discharging circuit is less than that of the charging circuit, and the rate of decay of voltage across resistor 28 is greater than the rate of rise, as shown in Fig. 2*e*.

The voltage wave form at the plate of tube 22, which is a resultant of wave forms 2*d* and 2*e*, is shown in Fig. 2*f*.

Although the leading edge of the negative trigger pulses 46 (see Fig. 2*d*) for the blocking oscillator arrives slightly ahead of the time that the sinusoidal wave form 2*b* reaches zero potential, the voltage swing during the interval ($t_4$ to $t_6$) that trigger tube 22 conducts is of the order of about five or ten volts and is such a small proportion of the total voltage swing, which may be of the order of 100 volts, that the pulses may be considered, for all practical purposes, as occurring simultaneously with the beginning of each cycle of oscillation of tuned circuit 12.

The positive half of each cycle of wave form 2*b* is clipped in order to prevent loading the tuned circuit 12 as a result of the heavy grid current, so that satisfactory oscillation is assured. Grid limiting also serves to permit production of a sharper trigger pulse, since the change from nonconduction to conduction occurs only during the relatively small time interval between cut-off and the limiting potential previously referred to.

A large portion of the fundamental component of the oscillator frequency appears across plate resistor 28 of trigger tube 22. The time constant of the decoupling network 28, 30 in the plate circuit of this tube is chosen so that a low pass filter is provided for the amplified voltage of the fundamental frequency signal, while at the same time furnishing a ground return for the pulse frequency signals. The fundamental or low frequency component of the voltage appearing across resistor 28 is fed back through coupling condenser 31 to the cathode side of tuned circuit 12 in phase with the oscillation of the tuned circuit and with suitable amplitude to maintain the oscillations until switch tube 10 conducts at time $t_n$, indicated in Fig. 1. When switch tube 10 conducts at time $t_n$, the oscillations in tuned circuit 12 are rapidly damped out, since the conducting tube is equivalent to a small resistance shunted across tank circuit 12.

It is desirable to prevent feeding back pulses from the plate circuit of tube 22 to the tuned circuit 12. This may be accomplished by means of capacitor 30, which acts as a bypass from the high-frequency component of the pulses.

If the capacitor 30 were removed from the circuit, most of the high frequency components of voltage would appear across resistor 28 and little voltage would appear across winding 26 of transformer 25. Consequently, capacitor 30 also is essential to insure that a pulse of sufficient amplitude is coupled to the input circuit of blocking oscillator 32.

The transformer primary winding 26 may be considered as a high pass filter which passes only the high-frequency components of the signal (wave form 2*d*) appearing at the plate of tube 22 and prevents the low frequency voltage from appearing across coil 26.

The pulses appearing in the plate circuit of tube 22 are coupled to transformer winding 35, which is in the grid circuit of blocking oscillator tube. 32. The blocking oscillator tube is normally biased below cut-off and blocking oscillator action is not initiated until the grid becomes sufficiently positive to conduct. The dots at each of windings 26, 34, and 35 of transformer 25 indicate similar instantaneous polarities. The pulses developed across winding 35 in the grid circuit of blocking oscillator tube 32 are of opposite phase to those developed in winding 26 in the plate circuit of trigger tube 22. Although the positive pulses of wave form 2*d* are coupled to the grid of blocking oscillator tube 32 as negative pulses, they are ineffective, since the tube is already operating below cut-off and these negative pulses merely cause the grid of tubes 32 to go still more negative. During each negative pulse of wave form 2*d*, however, the grid of blocking oscillator 32 becomes sufficiently positive to cause conduction in blocking oscillator tube 32.

When plate current commences to flow in the blocking oscillator, a voltage develops across plate winding 34 of transformer 25, and induces a voltage in the grid winding 35. The grid, when driven positive relative to its cathode, draws current and electrons accumulate on the plate of grid capacitor 37 near the grid. The grid voltage, in turn, causes more current to flow in tube 32, and the action continues until the plate current reaches saturation. At this point, the field associated with plate winding 34 stops increasing. For an instant there is no induced voltage in the grid winding 35 of the blocking oscillator, and the capacitor 37 in the grid circuit, which had previously been charged, begins to discharge. This causes the potential on the grid to become less positive and thereby causes less plate current to flow in the plate winding 34. The field around plate winding 34 starts to collapse and the collapsing field induces a voltage in the grid winding 35 in the reverse direction, so that the grid becomes more and more negative. This process continues until the grid is driven beyond cut-off and a cycle of operation of the blocking oscillator is completed. The range marker pulses are derived across cathode resistor 39 of blocking oscillator tube 32 and appear at terminal 40. It will be noted that no marker is generated at zero time; however, this is not a disadvantage since no marker is needed for zero range.

It is possible to count down from the fundamental frequency of the tuned circuit 12 and thereby generate the range markers for the adjacent ranges by varying the time constant in the grid circuit of blocking oscillator 32.

A first positive pulse applied to the grid of blocking oscillator 32 causes it to fire. The recovery time of the blocking oscillator is sufficiently rapid to permit firing on all succeeding pulses. If greater ranges are required, however, sufficient resistance may be switched into the grid circuit to permit firing only on every other pulse.

This invention is not limited to the particular details of construction, materials and processes described, as many equivalents will suggest themselves to those skilled in the art. For example, the tuned circuit in the cathode of the switch tube may be made tunable in order to vary the interval between successive range markers. The resistor in the grid circuit of the blocking oscillator may be made variable or a switch and a plurality of resistors of different size, as the case may be, may be used to accomplish the same result. It is obviously possible to combine the effects of both types of variations simultaneously. It is accordingly desired that the appended claims be given a broad interpretation commensurate with the scope of the invention within the art.

What is claimed is:

1. A system for producing equally spaced output pulses during occurrence of an input pulse comprising a first electron discharge device which is rendered nonconductive by said input pulse, a second electron discharge device, a tuned circuit in circuit with said first and second devices and balanced with respect to a predetermined reference potential, means for initiating oscillatory energy in said tuned circuit during application of the input pulse to said first device, the phase of said energy at one portion of said tuned circuit being in opposition to that at another portion of said tuned circuit, said second device being supplied with oscillatory energy from said one portion of said tuned circuit, means including said second device for producing trigger pulses in response to said supplied energy, and means responsive to said trigger pulses for generating output pulses.

2. A system for producing equally spaced output pulses during occurrence of an input pulse comprising a first electron discharge device which is rendered nonconductive by said input pulse, a second electron discharge device, a tuned circuit in circuit with said first and second devices and balanced with respect to a predetermined reference potential, means for initiating oscillatory energy in said tuned circuit during application of the input pulse to said first device, the phase of said energy at one portion of said tuned circuit being in opposition to that at another portion of said tuned circuit, said second device being supplied with oscillatory energy from said one portion of said tuned circuit, and means including said second device for limiting the amplitude of the positive-going excursions of said supplied oscillatory energy and for producing trigger pulses in response to said limited energy.

3. A system for producing equally spaced output pulses during occurrence of an input pulse comprising a first electron discharge device which is rendered nonconductive by said input pulse, a second electron discharge device, a tuned circuit interconnecting said first device and the input circuit of said second device and balanced with respect to a predetermined reference potential, means for initiating oscillatory energy in said tuned circuit during application of the input pulse to said first device, the phase of said energy at one portion of said tuned circuit connected to the input circuit of said second device being in opposition to that at another portion of said tuned circuit connected to said first device, an inductive impedance disposed in the output circuit of said second device, said second device being supplied with energy from said one portion of said tuned circuit, means including said second device for producing trigger pulses across said impedance during conduction of said second device, and means inductively coupled to said impedance for generating output pulses.

4. A system for producing equally spaced output pulses during occurrence of an input pulse comprising a first electron discharge device which is rendered nonconductive by said input pulse, a second electron discharge device, a tuned circuit interconnecting said first device and the input circuit of said second device and balanced with respect to a predetermined reference potential, means for initiating oscillatory energy in said tuned circuit during application of the input pulse to said first device, the phase of said energy at one portion of said tuned circuit connected to the input circuit of said second device being in opposition to that at another portion of said tuned circuit connected to said first device, an inductive impedance and a resistive-capacitive network disposed in the output circuit of said second device, said second device being supplied with energy from said one portion of said tuned circuit, means including said second device for producing trigger pulses across said impedance during conduction of said second device, means including said resistive-capacitive network for deriving a voltage during conduction of said second device which consists essentially of the fundamental component of said oscillatory energy, feedback means for applying a portion of said voltage to said other portion of said tuned circuit in phase with the energy in said other portion, and means responsive to said trigger pulses for generating output pulses.

5. A system for producing equally spaced output pulses during occurrence of an input trigger pulse comprising a first electron discharge device which is rendered nonconductive by said input pulse, a tuned circuit including a capacitor in shunt with an inductor whose midpoint is connected to a predetermined reference potential, said tuned circuit being in the space current path of said first device and triggered into oscillation concurrently with the arrival of said input pulse, said oscillatory voltage at one end of said tuned circuit remote from said first device being in phase opposition to the oscillatory voltage at the other end thereof adjacent said first device, a second electron discharge device having its input circuit connected to said one end of said tuned circuit and including in the output circuit thereof an inductive element, means including said second device for producing trigger pulses in the output circuit thereof, and a blocking oscillator including an input circuit inductively coupled to said inductive element for generating output pulses in response to said trigger pulses.

6. A system for producing equally spaced output pulses during occurrence of an input trigger pulse comprising a first electron discharge device which is rendered nonconductive by said input pulse, a tuned circuit including a capacitor in shunt with an inductor whose midpoint is connected to a predetermined reference potential, said tuned circuit being in the space current path of said first device and triggered into oscillation concurrently with the arrival of said input pulse, said oscillatory voltage at one end of said tuned circuit remote from said first device being in phase opposition to the oscillatory voltage at the other end thereof adjacent said first device, a second electron discharge device having its input circuit connected to said one end of said tuned circuit and including in the output circuit thereof an inductive element and a resistive-capacitive network, said second device limiting the amplitude of the positive halves of said oscillatory energy applied thereto, means including said second device for producing trigger pulses across said inductive element, means including said resistive-capacitive network for feeding back to said other end of said tuned circuit a low frequency component of energy developed across said resistor in proper phase to maintain substantially constant the amplitude of the oscillatory energy produced in said tuned circuit, and means coupled to said inductive element for generating output pulses in response to said trigger pulses.

References Cited in the file of this patent

UNITED STATES PATENTS

| | | |
|---|---|---|
| 2,433,282 | Lord | Dec. 23, 1947 |
| 2,509,792 | Westcott | May 30, 1950 |